United States Patent
Masumoto (10) Patent No.: US 8,360,504 B2
(45) Date of Patent: Jan. 29, 2013

(54) DRAINAGE STRUCTURE FOR DOUBLE DOORS

(75) Inventor: Atsuo Masumoto, Hiroshima (JP)

(73) Assignee: Nishikawa Rubber Co., Ltd., Hiroshima-shi (JP)

(*) Notice: Subject to any disclaimer, the term of this patent is extended or adjusted under 35 U.S.C. 154(b) by 137 days.

(21) Appl. No.: 13/045,894

(22) Filed: Mar. 11, 2011

(65) Prior Publication Data

US 2011/0252707 A1  Oct. 20, 2011

(30) Foreign Application Priority Data

Apr. 14, 2010  (JP) .................................. 2010-93070

(51) Int. Cl.
  *B60J 5/00*  (2006.01)
(52) U.S. Cl. ...................................... 296/147; 49/475.1
(58) Field of Classification Search .................. 296/147, 296/154; 49/476.1, 475.1, 495.1, 198.1, 49/368
  See application file for complete search history.

(56) References Cited

U.S. PATENT DOCUMENTS

| | | | | |
|---|---|---|---|---|
| 3,487,581 A | * | 1/1970 | Ellingson, Jr. | 49/478.1 |
| 6,536,161 B2 | * | 3/2003 | Saito | 49/368 |
| 7,000,959 B2 | * | 2/2006 | Sanders | 292/340 |
| 2001/0017006 A1 | * | 8/2001 | Saito | 49/368 |
| 2004/0163321 A1 | * | 8/2004 | Yamaoka et al. | 49/479.1 |

FOREIGN PATENT DOCUMENTS

| | | | | |
|---|---|---|---|---|
| JP | 62085714 A | * | 4/1987 | |
| JP | 2000-190730 A | | 7/2000 | |
| JP | 2001233061 A | * | 8/2001 | |
| JP | 2004-122959 A | | 4/2004 | |
| JP | 2005247199 A | * | 9/2005 | |

* cited by examiner

*Primary Examiner* — Lori Lyjak
(74) *Attorney, Agent, or Firm* — Holtz, Holtz, Goodman & Chick, PC (57) ABSTRACT

A weather strip 20 for double doors comprises: an installation base member 21 installed on a door join part side of a prior closing rear door 2 of double doors arranged on a side part of an automobile; a hollow seal member 22 which is integrally molded with the installation base member 21 and makes an elastic contact with a post closing front door 1 when the door is closed; and a fin 50 connected to a lower side of the hollow seal member 22, which includes a plane installation piece 51 installed on a lower end on a door join part side of the rear door 2 and a seal piece 52 which is integrally molded with the installation piece 51 and makes an elastic contact with the front door 1 when the door is closed, wherein: the installation piece 51 of the fin 50 has a concave ditch 80 formed on an installation surface side thereof, continuously extending from a lower side of the hollow seal member 22 to a hole 130 which is provided on a lower end on the door join part side of the rear door 2 and bores in the rear door 2.

6 Claims, 8 Drawing Sheets

DRAINAGE STRUCTURE FOR DOUBLE DOORS

BACKGROUND OF THE INVENTION

The present invention relates to: weather strips for double doors, which are installed on double doors on side parts or rear parts of automobiles and seal join parts between left side doors and right side doors when the doors are dosed; and a drainage structure for double doors employing the weather strips.

Figure 6:
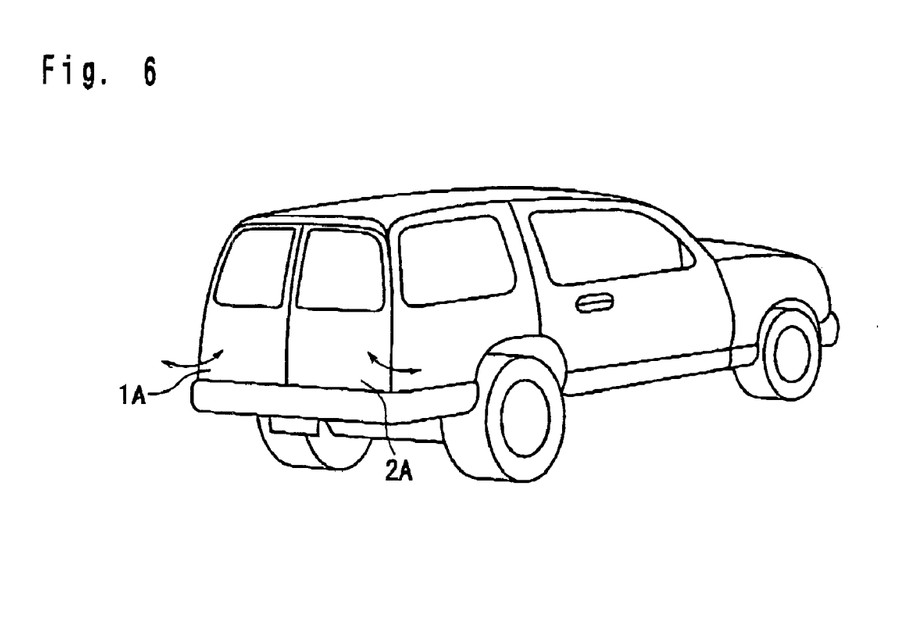
FIG. 6 is an external perspective view showing an automobile with double doors on a rear part thereof.
Figure 7:
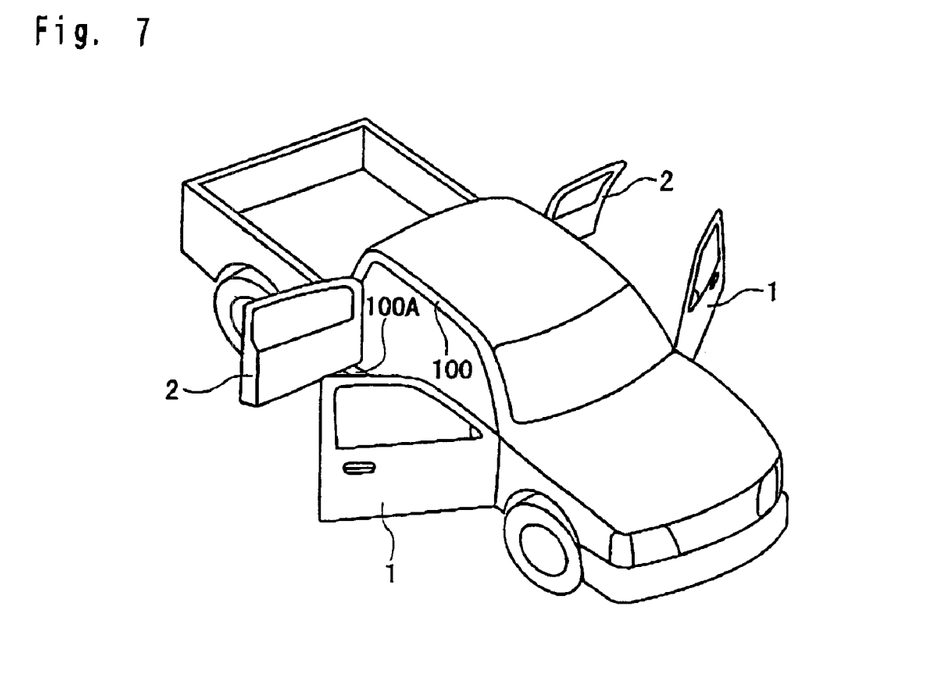
FIG. 7 is an external perspective view showing an automobile with double doors on a side part thereof.

The automobiles having the double doors installed on the rear parts or the side parts thereof, shown in FIGS. 6 and 7 have been known.

The automobiles having the double doors as side doors installed on the side parts thereof are improved in getting in or getting off property for the effect of a large opening formed by providing front doors 1 and rear doors 2 respectively hinged to the automobiles on the front sides and the rear sides thereof, removing center pillars (center pillar-less) and simultaneously opening both of the doors 1,2.

Figure 8:
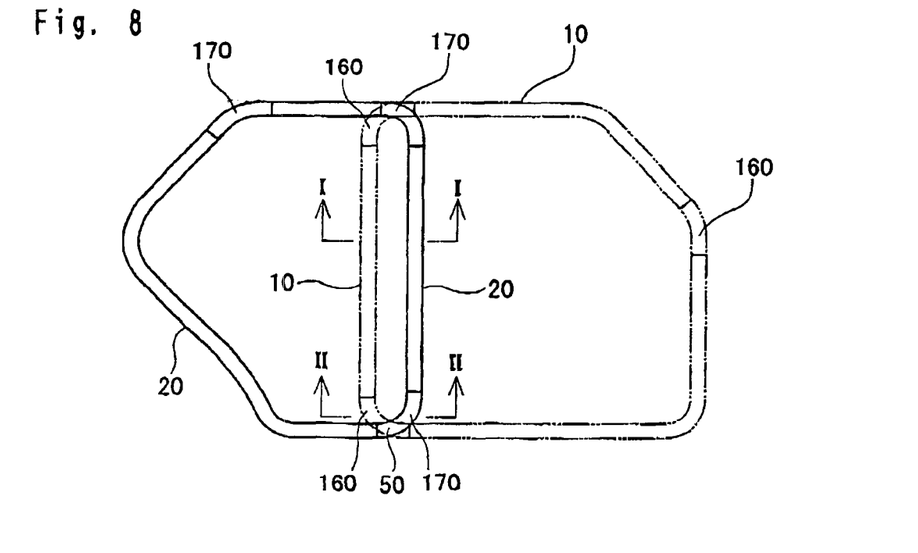
FIG. 8 is an enlarged side view showing weather strips for doors installed on the double doors shown in FIG. 7.

FIG. 8 illustrates a weather strip 10 for front doors and a weather strip 20 for rear doors respectively installed on outer circumferences of the front door 1 and the rear door 2. FIG. 8 illustrates the weather strip 10 for front doors in two-dot chain lines.

The weather strip 10 for front doors is formed by connecting two extrusion molded parts by molding on corner parts 160 and comprises: an installation base member 11 installed on the front door 1; and a hollow seal member 12 which is integrally molded with the installation base member 11 and swells toward an inner-cabin side when the front door 1 is closed.

The weather strip 20 for rear doors is formed by connecting two extrusion molded parts by molding on corner parts 170 in the same manner. On the extrusion molded part on a door join part side between the left side door and the right side door (in FIG. 7, the rear door 2 is the left side door and the front door 1 is the right side door), the weather strip 20 for rear doors comprises: an installation base member 21 installed on the rear door 2; and a hollow seal member 22 which is integrally molded with the installation base member 21 and swells toward an outer-cabin side when the door is closed. The weather strip 20 for rear doors also comprises fins 50 which are provided on the molded parts located at an upper end and a lower end on the door join part side. The firs 50 are connected to the hollow seal member 22. The fins 50 include: a plane installation piece 51 installed on the rear door 2; and a seal piece 52 which is integrally molded with the installation piece 51 and extending from an inner side of the rear door 2 toward a front side of the automobile.

Figure 9:
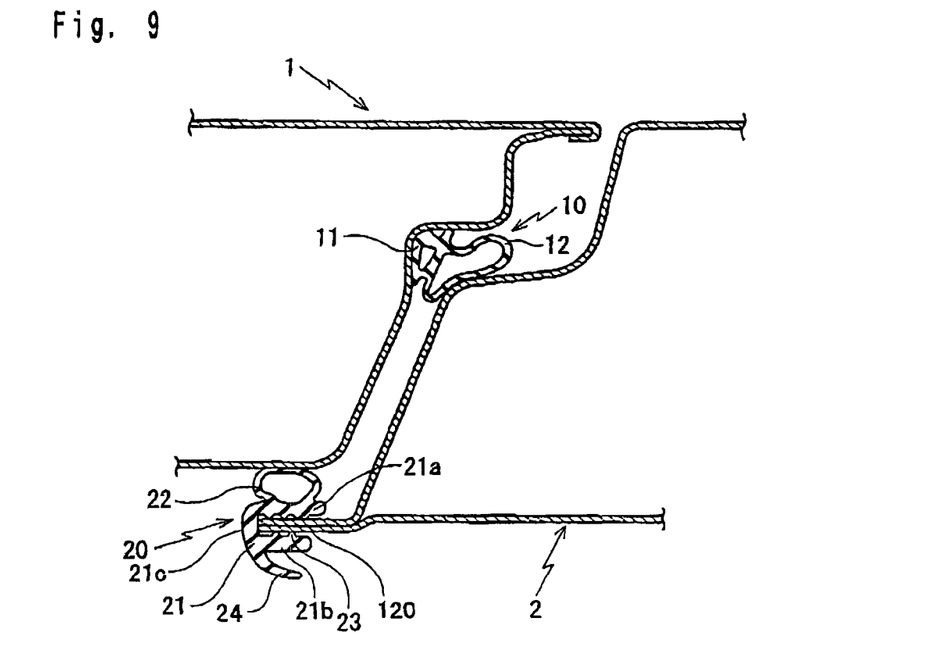
FIG. 9 is a I-I line enlarged cross section of FIG. 8, showing a state where the door is closed.
Figure 10:
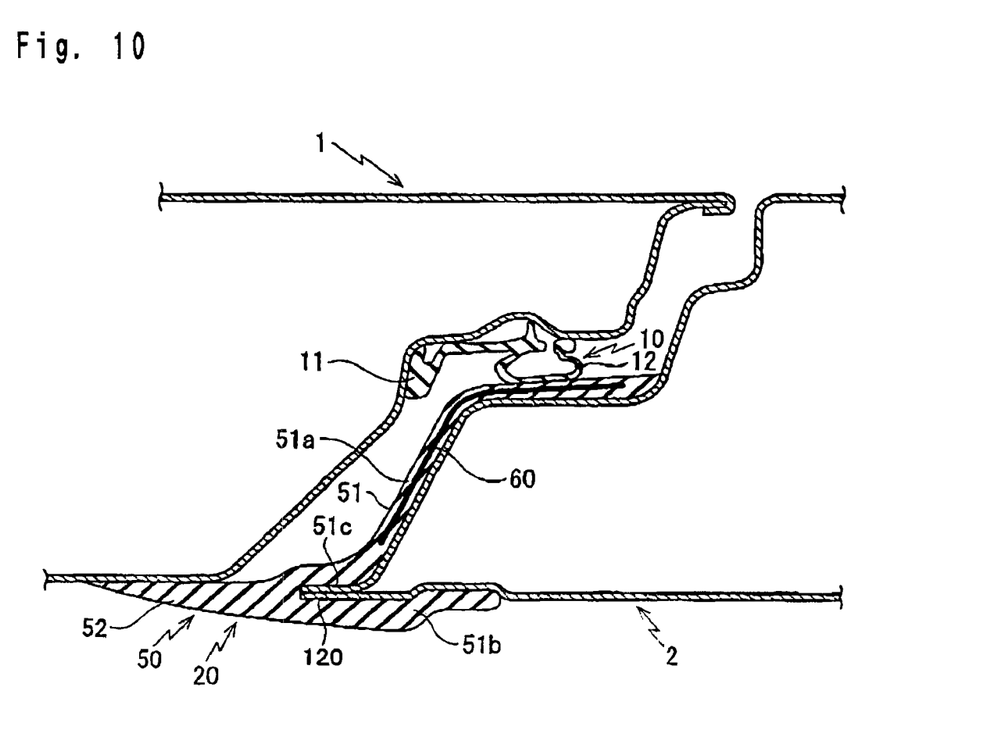
FIG. 10 is a II-II line enlarged cross section of FIG. 8, showing a state where the door is closed.
Figure 11:
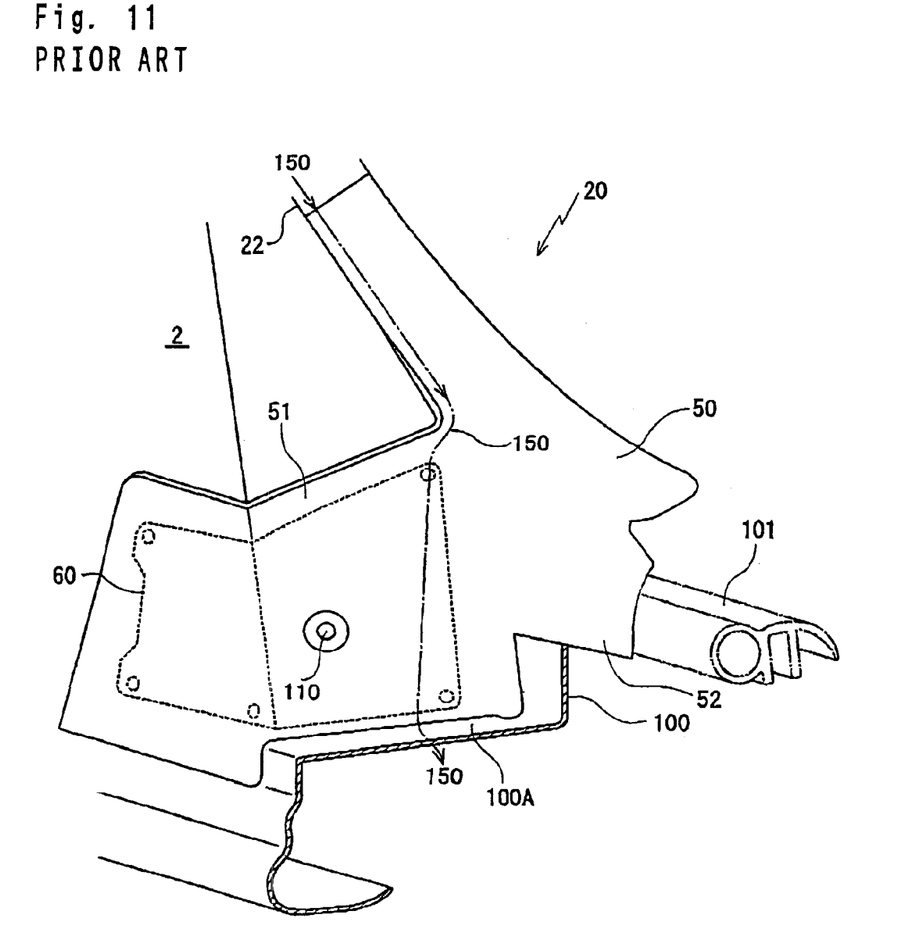
FIG. 11 is a perspective view showing an important part of a state where a weather strip for double doors according to a prior art is installed on a rear door.

When closing the left side door and the right side door, the rear door 2 is dosed first and the front door 1 is dosed subsequently. When the doors are closed, the hollow seal member 12 of the weather strip 10 for front doors installed on the front door 1 makes an elastic contact with the rear door 2 while the hollow seal member 22 of the weather strip 20 for rear doors installed on the rear door 2 makes an elastic contact with the front door 1 on the extrusion molded part on the door join part side to seal an outside and an inside of the automobile as shown in FIG. 9. On the molded parts located at the upper end and the lower end on the join part side of the doors, the hollow seal member 12 of the weather strip 10 for front doors installed on the front door 1 makes an elastic contact with the plane installation piece 51 of the fin 50 of the weather strip 20 for rear doors installed on the rear door 2 while an outer-cabin side of the seal piece 52 of the fin 50 of the weather strip 20 for rear doors installed on the rear door 2 makes an elastic contact with the front door 1 to seal the outside and the inside of the automobile as shown in FIG. 10. When the rear door 2 is dosed, the inner cabin side of the seal piece 52 makes an elastic contact with a weather strip 101 on a body side installed on a door opening edge on a body 100 side. As shown in FIG. 11, the fin 50 has an insert panel 60 embedded in the installation piece 51 thereof to improve rigidity and is fixed to the lower end on the door join part side of the rear door 2 together with the insert panel 60 by clips 110.

Figure 12:
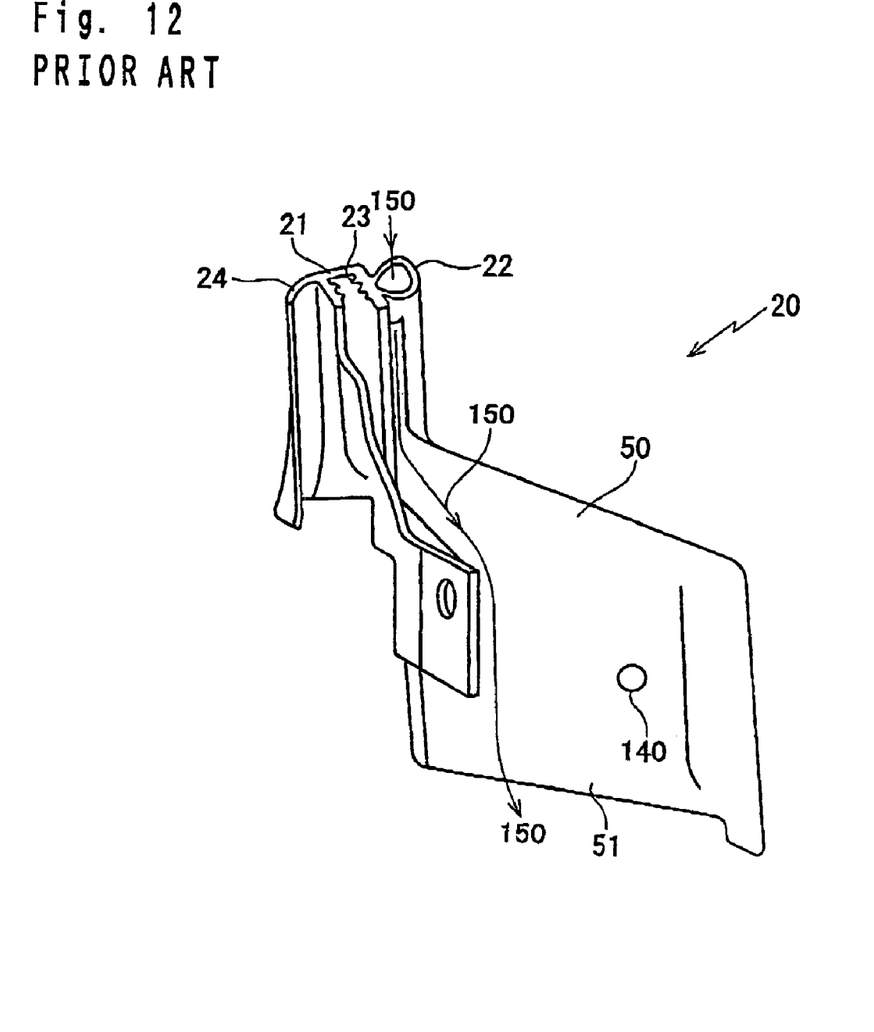
FIG. 12 is a perspective view showing an important part of an installation surface side of the weather strip for double doors according to the prior art shown in FIG. 11.

As mentioned above, on the door join part side of the weather strip 20 for rear doors installed on the rear door 2, the extrusion molded part has the molded parts integrally molded with the upper end and the lower end thereof, which connect with the hollow seal member 22. Accordingly, water 150 which enters a slit 80 for pulling out a core (not shown) on the molded part on the upper end of the door join part side flows down inside the hollow seal member 22 and flows out of a slit 180 for pulling out a core on the molded part on the lower end of the door join part as shown in FIG. 12. The water 150 flowing out of the slit 180 for pulling out a core subsequently flows between the rear door 2 and the installation piece 51 of the fin 50 and finally reaches a step 100A of the body 100. Such a structure has caused problems that the step 100A may get wet so that passengers feel uncomfortable.

The above-mentioned drainage structure of water entering from an upper part of the door join part of the double doors on the automobiles is disclosed, for example, in Japanese Patent Nos. 4031134 and 4128421.

Japanese Patent No. 4031134 discloses to arrange a drainage passage for draining water, which flows down inside an extrusion molded hollow seal member and accumulates in the molded part on the lower end side, on a position where a direct hit of high pressure water from the outside of the automobile is prevented.

Japanese Patent No. 4128421 discloses to protrudingly provide a receiving part for receiving water and to pour the water inside the door, which enters from an upper part of a space between an upper part of a front door and an opening seal installed on a body panel which makes an elastic contact with the front door when the door is closed.

However, since the drainage passage disclosed in Japanese Patent No. 4031134 and the receiving part disclosed in Japanese Patent No. 4128421 are exposed on the outer-cabin side, oscillation from opening and closing doors may cause scatter of water and the drainage passage and the receiving part may be affected by the open air including wind. Also, exposure of the drainage passage and the receiving part outside the automobile deteriorates an external appearance.

Further, Japanese Patent No. 4128421 does not disclose to drain the water which flows down inside the extrusion molded hollow seal member and reaches the molded part on the lower end side.

Therefore, an object of the present invention is to provide weather strips for double doors, capable of draining water which flows down inside the hollow seal member on the door join parts without fail escaping notice of the passengers and drainage structure for the double doors with the weather strips.

SUMMARY OF THE INVENTION

In order to achieve the above-mentioned object, according to one aspect of the invention a weather strip (20) for double doors is provided, comprising: an installation base member (21) installed on a door join part side of a prior dosing door (2, 2A) of a pair of right and left double doors including the prior closing door (2, 2A) and a post dosing door (1, 1A) which are arranged on a side part or a rear part of an automobile; a hollow seal member (22) which is integrally molded with said installation base member (21) and makes an elastic contact with said post dosing door (1, 1A) when the door is closed to seal an inside and an outside of the automobile; and a fin (50) connected to a lower side of said hollow seal member (22), which includes a plane installation piece (51) installed on a lower end on a door join part side of said prior closing door (2, 2A) and a seal piece (52) which is integrally molded with said installation piece (51) and makes an elastic contact with said post dosing door (1, 1A) when the door is closed, wherein: said installation piece (51) of said fin (50) has a concave ditch (80) formed on an installation surface side thereof, continuously extending from a lower side of said hollow seal member (22) to a hole (130) which is provided on a lower end on the door join part side of said prior dosing door (2, 2A) and bores in said prior closing door (2, 2A).

In addition, according to an aspect of the present invention, a drainage structure for double doors employing a weather strip (20) for double doors is provided, comprising: an installation base member (21) installed on a door join part side of a prior dosing door (2, 2A) of a pair of right and left double doors including the prior dosing door (2, 2A) and a post dosing door (1, 1A), which are arranged on a side part or a rear part of an automobile; a hollow seal member (22) which is integrally molded with said installation base member (21) and makes an elastic contact with said post dosing door (1, 1A) when the door is dosed to seal an inside and an outside of the automobile; and a fin (50) connected to a lower side of said hollow seal member (22), which includes a plane installation piece (51) installed on a lower end on a door join part side of said prior closing door (2, 2A) and a seal piece (52) which is integrally molded with said installation piece (51) and makes an elastic contact with said post closing door (1, 1A) when the door is dosed, wherein: said prior closing door (2, 2A) has a hole (130) boxing therein formed on a lower end on a door join part side thereof facing an installation surface of the installation piece (51) of said fin (50) while the installation piece (51) of said fin (50) has a concave ditch (80) formed on an installation surface side thereof, continuously extending from a lower side of said hollow seal member (22) to said hole (130) for guiding water (150) from said hole (130) to an inside of said prior closing door (2, 2A), which enters and flows down inside said hollow seal member (22).

In addition, according to an aspect of the present invention, the concave ditch (80) formed on the installation piece (51) of said fin (50) has ribs (81,82) formed along an upper part thereof, which make an elastic contact with said prior closing door (2, 2A).

In addition, according to an aspect of the present invention, foamed sealing material (90) is set up along the concave ditch (80) formed on the installation piece (51) of said fin (50).

In addition, according to an aspect of the present invention, the installation piece (51) of said fin (50) has an insert panel (70) embedded therein.

In addition, according to an aspect of the present invention, said insert panel (70) includes a fork part (71) which sandwiches said concave ditch (80) therebetween.

In addition, according to an aspect of the present invention, the installation piece (51) of said fin (50) is fixed on said prior closing door (2, 2A) by clips (110) so that an upper part of the concave ditch (80) formed on the installation piece (51) of said fin (50) is brought into pressure contact with said prior closing door (2, 2A).

Symbols in parentheses show constituents or items corresponding to Figures and DESCRIPTION OF PREFERRED EMBODIMENT.

With the structure of the present invention, the fin including the installation piece and the seal piece is connected to the lower side of the hollow seal member integrally molded with the installation base member installed on the door join part side of the prior closing door and the installation piece of the fin has the concave ditch formed on the installation surface side thereof, continuously extending from the lower side of the hollow seal member to the boring hole provided on the lower end of the door join part side of the prior closing door. Accordingly, the water which streams down along the inside of the hollow seal member flows down the concave ditch, reaches the boring hole and is guided into the prior closing door via the boring hole.

Since the concave ditch fixes a watercourse, the water which streams down along the inside of the hollow seal member does not seep out of a space between the installation piece of the fin and the prior closing door and wet a body panel. Accordingly, in the double doors arranged on the side parts of the automobile, comprising the front door as the post closing door and the rear door as the prior closing door, for instance, a step of the body as a getting in or getting off part for passengers does not get wet by the water which streams down along the inside of the hollow seal member. As a result, external appearance of the automobile is not deteriorated and the passengers do not feel uncomfortable.

In addition, the prior closing door has the hole boring therein formed on the lower end on the door join part side thereof. The lower end on the door join part side of the prior closing door faces the installation surface of the installation piece of the fin. The installation piece of the fin has the concave ditch formed on the installation surface side of thereof, continuously extending from the lower side of the hollow seal member to the hole in order to guide the water from the hole to the inside of the prior closing door, which enters and flows down inside the hollow seal member. Accordingly, the water which streams down along the inside of the hollow seal member does not seep out of a space between the installation piece of the fin and the prior dosing door and wet the body panel.

In addition, the concave ditch formed on the installation piece of the fin has the ribs formed along the upper part thereof so that the ribs make the elastic contact with the prior closing door. Such a structure further prevents the water which flows along the concave ditch from crossing the concave ditch and flowing down.

In addition, the foamed sealing material is set up along the concave ditch, which functions as a weir. Such a structure brings a sense of security even in case the water which flows along the concave ditch crosses the concave ditch.

In addition, the insert panel embedded in the installation piece of the fin improves rigidity and enables the installation piece to adhere on the prior closing door.

In addition, since the insert panel includes the fork part which sandwiches the concave ditch therebetween, the concave ditch is adhered to the prior closing door while the insert panel does not hamper a watercourse.

In addition, since the installation piece of the fin is fixed on the prior closing door by clips so that the upper part of the concave ditch formed on the installation piece of the fin is brought into pressure contact with the prior closing door, the water flows inside the concave ditch without fail. Also, when the installation piece of the fin together with the insert panel is fixed on the prior closing door by clips, the water flows inside the concave ditch further without fail.

DESCRIPTION OF PREFERRED EMBODIMENT

Referring to FIG. 1 to FIG. 3 and FIG. 7 to FIG. 10, a weather strip for double doors and a drainage structure for double doors employing the weather strip, according to an embodiment of the present invention will be described. When constituents or items correspond to those in prior arts, the same symbols are used.

In the same manner as a weather strip 20 for double doors according to the prior art, a weather strip for double doors according to the embodiment of the present invention is a weather strip 20 for rear doors, installed on an outer circumference of a rear door 2 of a pair of right and left double doors comprising the rear door 2 on a prior closing door side and a front door 1 on a post closing door side, shown in FIG. 7 and FIG. 8. Also, a weather strip 10 for front doors is installed along an outer circumference of a front door 1.

The weather strip 10 for front doors is formed by connecting two extrusion molded parts by molding on corner parts 160 and comprises: an installation base member 11 installed on the front door 1; and a hollow seal member 12 which is integrally molded with the installation base member 11 and swells toward an inner-cabin side when the front door 1 is closed. The weather strip 10 comprises both the installation base member 11 and the hollow seal member 12 in any part of both of the molded part and the extrusion molded part.

The weather strip 20 for rear doors is formed by connecting two extrusion molded parts by molding on corner parts 170 in the same manner. On the extrusion molded part on the door join part side, the weather strip 20 for rear doors comprises: an installation base member 21 installed on the rear door 2; and a hollow seal member 22 which is integrally molded with the installation base member 21 and swells toward an outer-cabin side when the door is closed. The weather strip 20 for rear doors also comprises fins 50 which are provided on the molded part located at an upper end and a lower end on the door join part side. The fins 50 are connected to the hollow seal member 22 and include an installation piece 51 and a seal piece 52.

As shown in FIG. 9, the installation base member 21 of the weather strip 20 for rear doors is installed on the rear door 2 by inserting a cross-section roughly U-shaped opening into a flange 120. The opening comprises an outer-cabin side wall 21a, an inner-cabin side wall 21b and a connecting wall 21c. The flange 120 comes on a front side of the rear door 2 when the rear door 2 is closed and is protrudingly formed from the inner-cabin side toward a front-cabin side. The hollow seal member 22 is integrally molded with the outer-cabin side wall 21a of the installation base member 21. The installation base member 21 has a plurality of lips 23 formed inside, which protrude inward and hold the flange 120. The installation base member 21 also has a seal lip 24 formed on a connecting part of the inner-cabin side wall 21b and the connecting wall 21c, which extends toward the inner-cabin side.

The installation piece 51 of the fin 50 of the weather strip 20 for rear doors is plane and thin. The installation piece 51 comprises: a cross-section roughly rectangular outer-cabin side piece 51a which extends from the inner-cabin side toward the outer-cabin side, bends on a corner part of the rear door 2 panel and further extends to the rear of the automobile, thereby fitting along a shape of the rear door 2 panel; and a plate-like inner-cabin side piece 51b which extends from an inside of the rear door 2 to the rear of the automobile. The installation piece 51 is installed on the rear door 2 by inserting a fitting concave 51c into the flange 120. The fitting concave 51c is formed between the outer-cabin side piece 51a and the inner-cabin side piece 51b and opens toward a rear side of the automobile. The flange 120 comes on the front side of the rear door 2 when the rear door 2 is closed and is protrudingly formed from the inner-cabin side toward the front-cabin side. The seal piece 52 is integrally molded with the connecting part between the outer-cabin side piece 51a and the inner-cabin side piece 51b of the installation piece 51 and tapers off from the inside of the rear door 2 toward the front-cabin side.

Figure 1:
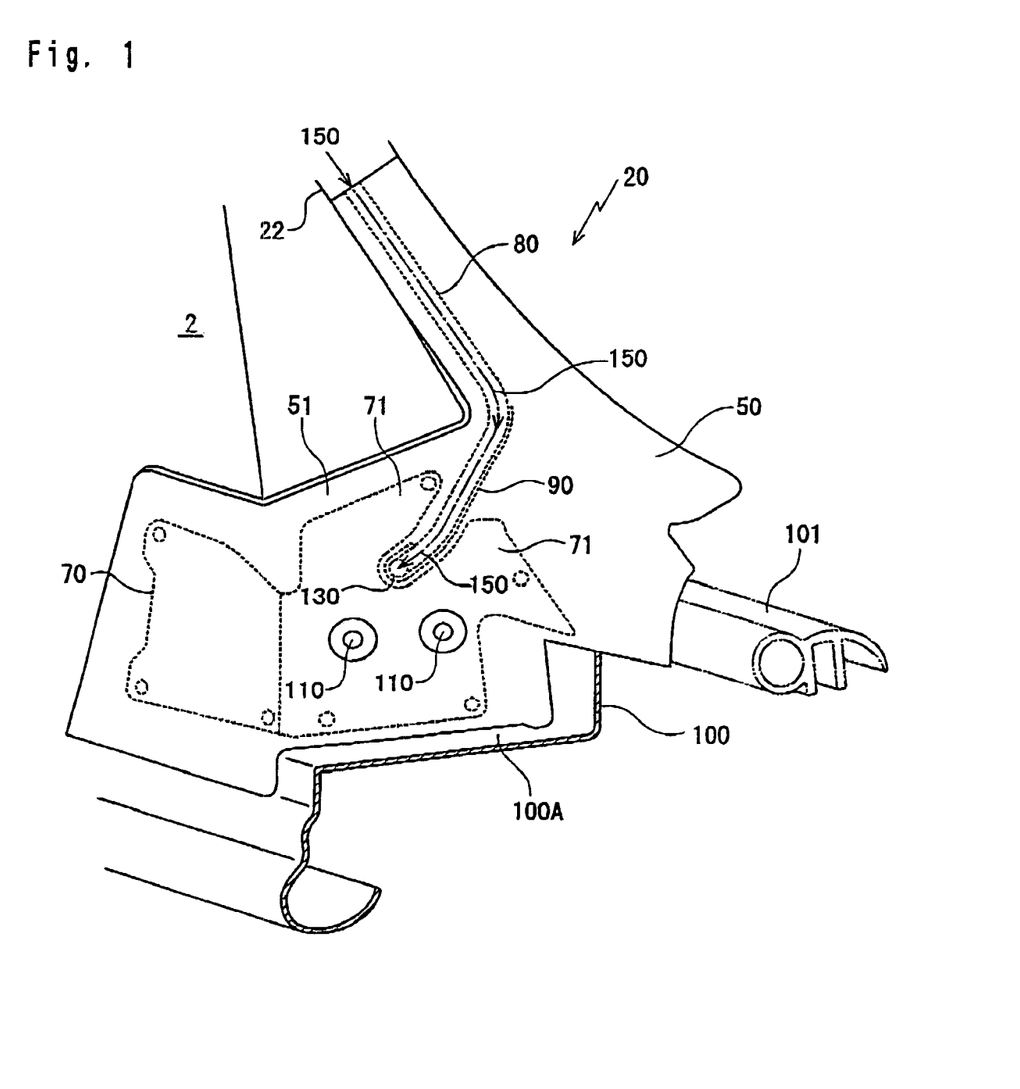
FIG. 1 is a perspective view showing an important part of a state where a weather strip for double doors according to an embodiment of the present invention is installed on a rear door.

When both the right and left doors are closed, on the extrusion molded part on the door join part side, the hollow seal member 12 of the weather strip 10 for front doors installed on the front door 1 makes an elastic contact with the rear door 2 while the hollow seal member 22 of the weather strip 20 for rear doors installed on the rear door 2 makes an elastic contact with the front door 1 to seal an outside and an inside of the automobile as shown in FIG. 9. On the molded parts located at the upper end and the lower end on the door join part side, the hollow seal member 12 of the weather strip 10 for front doors installed on the front door 1 makes an elastic contact with the installation piece 51 of the fin 50 of the weather strip 20 for rear doors installed on the rear door 2 while the outer-cabin side of the seal piece 52 of the fin 50 of the weather strip 20 for rear doors installed on the rear door 2 makes an elastic contact with the front door 1 to seal the outside and the inside of the automobile as shown in FIG. 10. When the rear door 2 is closed, the inner cabin side of the seal piece 52 makes an elastic contact with the weather strip 101 on a body side installed on edge parts of open doors on a body 100 side. As shown in FIG. 1, the fin 50 has an insert panel 70 embedded in the installation piece 51 thereof to improve rigidity and is fixed to the lower end on the join part side of the rear door 2 together with the insert panel 70 by clips 110.

Figure 2:
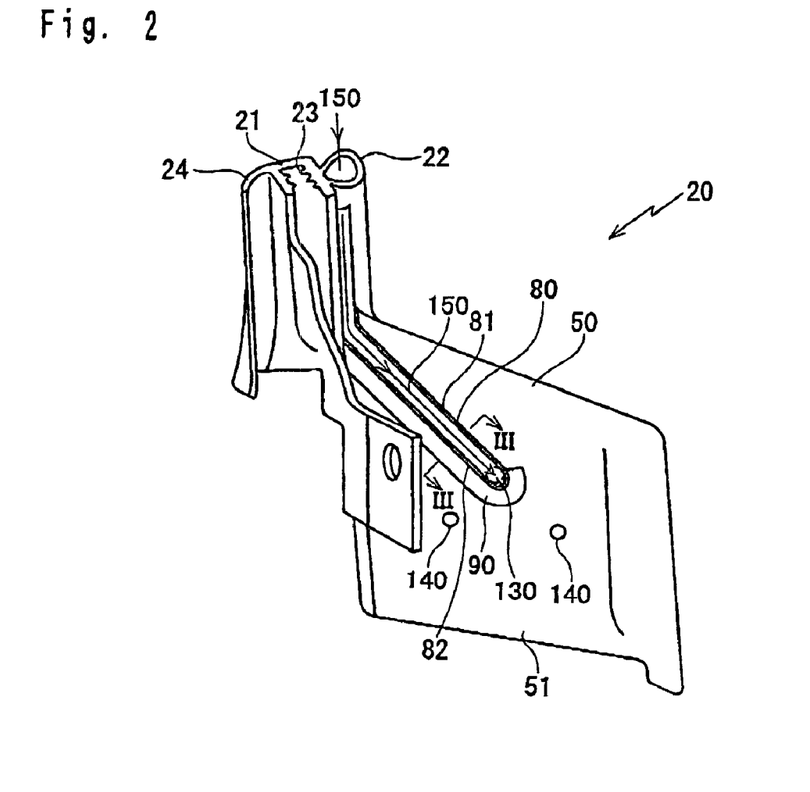
FIG. 2 is a perspective view showing an important part of an installation surface side of the weather strip for double doors according to the embodiment of the present invention shown in FIG. 1.
Figure 3:
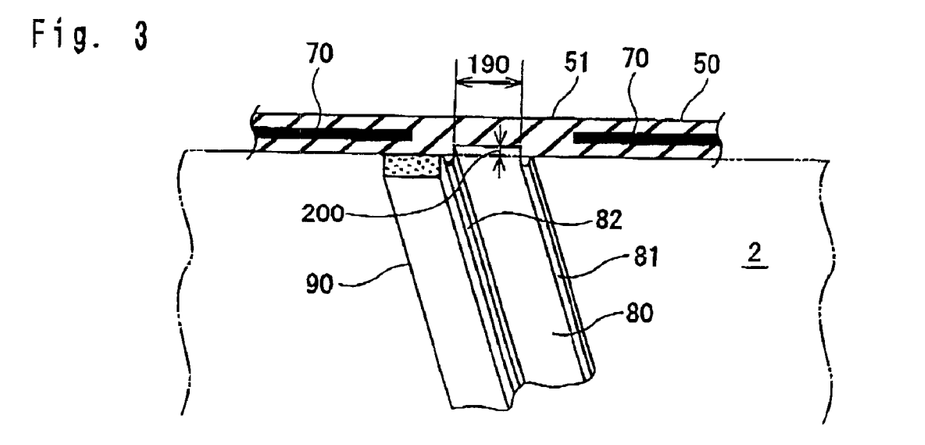
FIG. 3 is a III-III line partial cross section of FIG. 2, showing a concave ditch of the weather strip for double doors according to the embodiment of the present invention.

As shown in FIG. 1 to FIG. 3, on the molded part located at the lower end on the door join part side of the weather strip 20 for rear doors, a concave ditch 80 extending from an upper part to a lower part is formed on an installation surface side of the installation piece 51 of the fin 50, that is the rear door 2 side on which the installation piece 51 is installed.

An upper end of the concave ditch 80 reaches a lower side of the extrusion molded hollow seal member 22, that is a border part on the hollow seal member 22 between the extrusion molded part and the molded part while a lower end of the concave ditch 80 reaches a drainage hole 130 which is formed on the lower end on the door join part side of the rear door 2 and bores in the rear door 2. The drainage hole 130 is formed in advance on a position on the lower end on the door join part side of the rear door 2. In the present embodiment, the drainage hole 130 is formed on a position on the rear door 2, which faces roughly a center of the installation surface of the installation piece 51 while boring in the rear door 2. In case the rear door has a ready-made boring hole formed on the lower end on the door join part side thereof, the installation piece 51 is installed in such a manner as to cover the hole.

As shown in FIG. 3, the concave ditch 80 has ribs 81, 82 formed on upper parts on the right and left sides thereof, which are culminations of two rising surfaces of the ditch 80. The ribs 81, 82 formed along the concave ditch 80 make an elastic contact with the rear door 2. The ribs 81, 82 protrude roughly by 0.5 mm and make the elastic contact with the rear door 2 when the installation piece 51 is installed on the rear door 2.

Further, foamed sealing material 90 including EPTSEALER 90 is set up along the concave ditch 80. The EPTSEALER 90 is preferably set up along the ribs 81, 82 without aperture therebetween but may also be set up at a distance from the ribs 81, 82. Also, the EPTSEALER 90 may be installed on the upper side of the concave ditch 80.

The concave ditch 80 preferably is not less than 5 mm in width 190 and not less than 2 mm in depth 200 for the purpose of effectively draining water 150. The drainage hole 130 preferably has a diameter of not less than 5 mm. The drainage hole 130 may also be a rectangle hole which is 5 mm per side instead of a circular hole.

As shown in FIG. 1, the insert panel 70 embedded in the installation piece 51 of the fin 50 includes a fork part 71 which sandwiches the concave ditch 80 formed on the installation piece 51 so that the insert panel 70 does not to cut the concave ditch 80 into pieces, which is a watercourse for the water 150.

The installation piece 51 of the fin 50 together with the insert panel 70 is fixed on the rear door 2 by clips 110 so that the ribs 81, 82 formed on the concave ditch 80 are brought into pressure contact with the rear door 2.

In FIG. 1, the clips 110 are provided under the drainage hole 130. While two clips are provided in FIG. 1, the number is not limited and one clip or a plurality of clips not less than two may be provided respectively just under the hole 130 or around the concave ditch 80.

According to the above-mentioned drainage structure for the double doors, the water 150 which enters and flows down inside the hollow seal member 22 via a slit (not shown) for pulling out a core of the molded part on the upper end on the door join part side further flows down along the concave ditch 80 formed on the installation piece 51 of the fin 50 on the molded part located at the lower side, reaches the boring hole 130 and is guided into the rear door 2 via the boring hole 130 as shown in FIG. 1 and FIG. 2. In FIG. 1, the water 150 flows toward inner side of the paper which is the rear door 2 side from the boring hole 130. In FIG. 2, the water 150 flows toward front side of the paper which is the rear door 2 side from the boring hole 130 and is guided into the rear door 2. The water 150 guided into the rear door 2 is discharged outside from a drain hole (not shown) provided on a bottom of the rear door 2.

The structure which fixes the watercourse for the effect of the concave ditch 80 formed on the installation surface side of the installation piece 51 prevents the water which streams down along the inside of the hollow seal member 22 from seeping out of a space between the installation piece 51 of the fin 50 and the rear door 2 and wetting a step 100A of a body 100.

Especially, formation of the ribs 81, 82 which make the elastic contact with the rear door 2 along the concave ditch 80 formed on the installation piece 51 of the fin 50 enables the water 150 to flow inside the concave ditch 80 without fail. Also, the EPTSEALER 90 brings a sense of security, which is set up along the concave ditch 80 and functions as a weir even in case the water 150 crosses the concave ditch 80.

In addition, since the installation piece 51 of the fin 50 together with the insert panel 70 is fixed on the rear door 2 by clips so that the ribs 81, 82 formed along the concave ditch 80 are brought into pressure contact with the rear door 2, the water 150 flows inside the concave ditch 80 without fail. Further, since the insert panel 70 includes a fork part 71 which sandwiches the concave ditch 80 therebetween, the concave ditch 80 can be adhered to the rear door 2 more effectively by providing the clips 110 at a short distance from the concave ditch 80 as shown in FIG. 1. An upper side of the insert panel 70 may be extended up to around the extrusion molded part along the concave ditch 80. In case even an ordinary plate-like insert panel (an example of which is the insert panel 60 in FIG. 11 according to a prior art) without the fork part 71 thereon can secure adherence of the concave ditch 80 to the rear door 2, the ordinary plate-like insert panel can be embedded in such a manner as to circumvent the concave ditch 80. Furthermore, instead of embedding the insert panel which circumvents the concave ditch 80 as shown in FIG. 1 or FIG. 3, an insert panel including the insert panel 60 in FIG. 11 according to a prior art can be embedded in such a manner as to cover the concave ditch 80.

While the embodiment of the present invention describes the drainage structure for a pair of right and left double doors which are arranged on a side part of an automobile, the drainage structure shown in FIG. 6 can also be employed in a pair of double doors which is arranged on a rear part of an automobile and comprising a prior closing door 2A (employing a structure of the rear door 2 of the present embodiment) and a post closing door 1A (employing a structure of the front door 1 of the present embodiment). The drainage structure on the rear part of the automobile prevents the body panel from getting wet by the dripped water when both of the doors 1A, 2A are opened.

Figure 4:
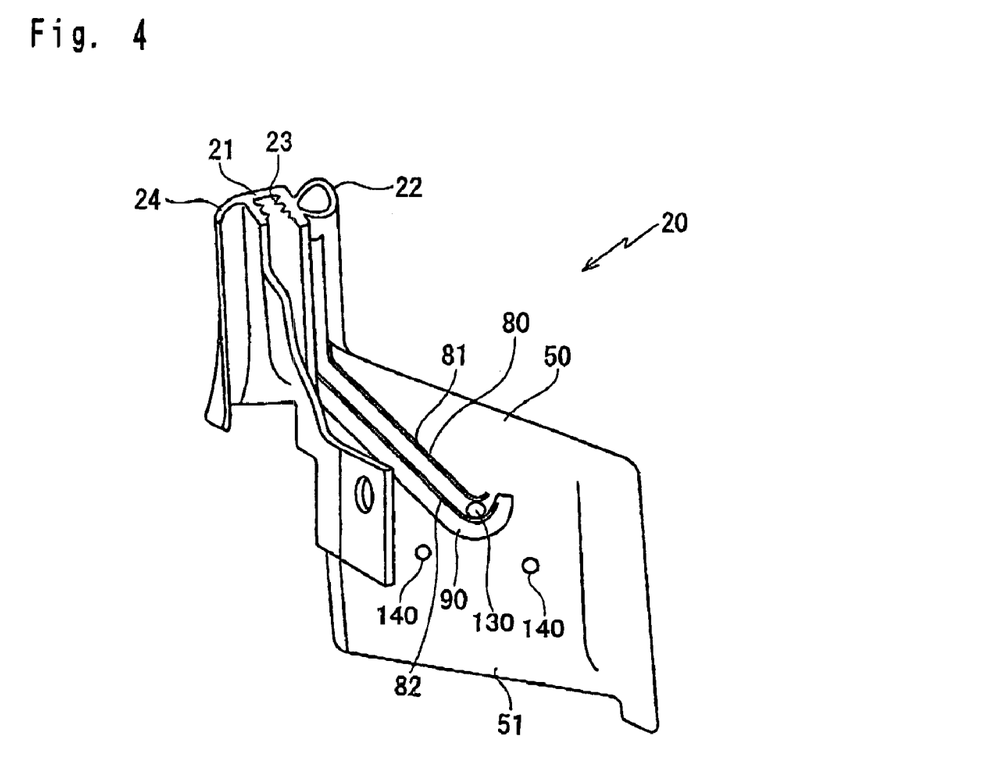
FIG. 4 is a perspective view of an important part of an installation surface side of another weather strip for double doors according to the embodiment of the present invention shown in FIG. 1.

The concave ditch 80 formed on the installation piece 51 of the fin 50 may have any shape as long as the concave ditch 80 allows the water 150 to flow thereinside to the boxing hole 130 formed on the rear door 2 without fail. Examples of the shape of the concave ditch 80 include: a concave ditch 80 which is roughly linearly formed to the boring hole 130 and dams up the water 150 by connecting the ribs 81 and 82; and a concave ditch 80 shown in FIG. 4, which is bent upward around the boring hole 130 and open without connecting the rib 81 and the rib 82.

Figure 5:
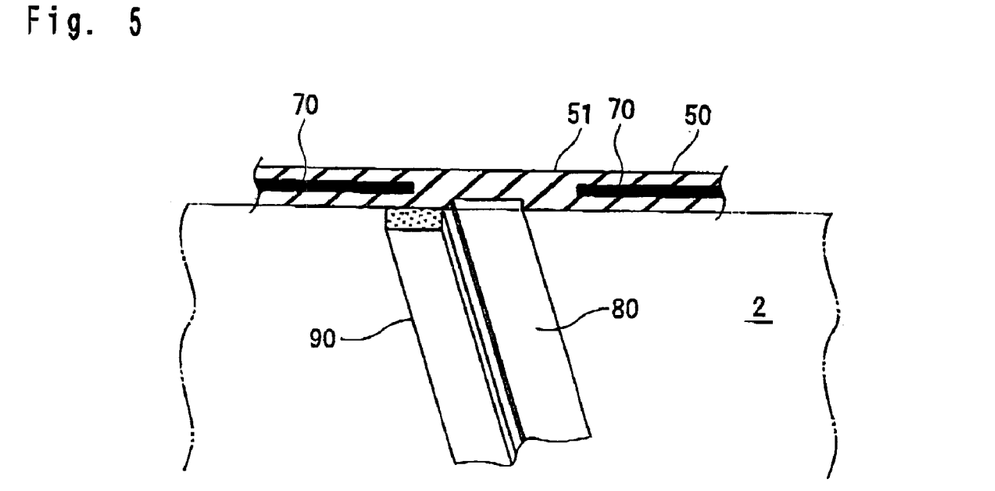
FIG. 5 is a III-III line partial cross section of FIG. 2 except for ribs 81, 82, showing another concave ditch of the weather strip for double doors according to the embodiment of the present invention.

The rib 81 and the rib 82 may be omitted as shown in FIG. 5 as long as the fin 50 can be installed on the rear door 2 sufficiently. Also, the EPTSEALER 90 may be omitted. Further, the insert panel 70 can be omitted as long as the fin 50 has rigidity and sufficient sealing property while the concave ditch 80 sufficiently adheres to the rear door 2 even without the insert panel 70.

Installation method of the fin 50 on the rear door 2 is not limited to the use of the clips 110.

We claim:

1. A drainage structure for double doors employing a weather strip for double doors, comprising: an installation base member installed on a door join part side of a prior closing door of a pair of right and left double doors including the prior closing door and a post closing door, which are arranged on a side part or a rear part of an automobile; a hollow seal member which is integrally molded with said installation base member and makes an elastic contact with, said post closing door when the door is closed to seal an inside and an outside of the automobile; and a fin connected to a lower side of said hollow seal member, which includes a plane installation piece installed on a lower end on a door join part side of said prior closing door and a seal piece which is integrally molded with said installation piece and makes an elastic contact with said post closing door when the door is closed, wherein:

said prior closing door has a hole boring therein formed on a lower end on a door join part side thereof facing an installation surface of the installation piece of said fin while the installation piece of said fin has a concave ditch formed on an installation surface side thereof, continuously extending from a lower side of said hollow seal member to said hole for guiding water from said hole to an inside of said prior closing door, which enters and flows down inside said hollow seal member.

2. The drainage structure for double doors as claimed in claim 1, wherein:

the concave ditch formed on the installation piece of said fin has ribs formed along an upper part thereof, which make an elastic contact with said prior closing door.

3. The drainage structure for double doors as claimed in claim 1, wherein:

foamed sealing material is set up along the concave ditch formed on the installation piece of said fin.

4. The drainage structure for double doors as claimed in claim 1, wherein:

the installation piece of said fin has an insert panel embedded therein.

5. A drainage structure for double doors employing a weather strip for double doors, comprising: an installation base member installed on a door join part side of a prior closing door of a pair of right and left double doors including the prior closing door and a post closing door, which are arranged on a side part or a rear part of an automobile; a hollow seal member which is integrally molded with said installation base member and makes an elastic contact with said post closing door when the door is closed to seal an inside and an outside of the automobile; and a fin connected to a lower side of said hollow seal member, which includes a plane installation piece installed on a lower end on a door join part side of said prior closing door and a seal piece which is integrally molded with said installation piece and makes an elastic contact with said post closing door when the door is closed, wherein:

said prior closing door has a hole boring therein formed on a lower end on a door join part side thereof facing an installation surface of the installation piece of said fin while the installation piece of said fin has a concave ditch formed on an installation surface side thereof, continuously extending from a lower side of said hollow seal member to said hole for guiding water from said hole to an inside of said prior closing door, which enters and flows down inside said hollow seal member;

the installation piece of said fin has an insert panel embedded therein; and said insert panel includes a fork part which sandwiches said concave ditch therebetween.

6. The drainage structure for double doors as claimed in claim 1, wherein:

the installation piece of said fin is fixed on said prior closing door by clips so that an upper part of the concave ditch formed on the installation piece of said fin is brought into pressure contact with said prior closing door.

* * * * *